(12) United States Patent
Abe

(10) Patent No.: US 8,750,442 B2
(45) Date of Patent: Jun. 10, 2014

(54) DIGITAL RECEIVER AND WAVEFORM COMPENSATION METHOD

(71) Applicant: Junichi Abe, Tokyo (JP)

(72) Inventor: Junichi Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/885,364

(22) PCT Filed: Oct. 1, 2012

(86) PCT No.: PCT/JP2012/006273
§ 371 (c)(1),
(2), (4) Date: May 14, 2013

(87) PCT Pub. No.: WO2013/084391
PCT Pub. Date: Jun. 13, 2013

(65) Prior Publication Data
US 2013/0251082 A1    Sep. 26, 2013

(30) Foreign Application Priority Data

Dec. 8, 2011    (JP) ................................ 2011-268995

(51) Int. Cl.
*H04B 1/10* (2006.01)
*H04B 3/46* (2006.01)
*H03K 5/159* (2006.01)

(52) U.S. Cl.
USPC ............................ 375/350; 375/226; 375/232

(58) Field of Classification Search
USPC ......... 375/224, 226, 229, 230, 232, 316, 350, 375/355
See application file for complete search history.

(56) References Cited

U.S. PATENT DOCUMENTS

| | | | |
|---|---|---|---|
| 3,679,983 A * | 7/1972 | Theriot .......................... | 375/232 |
| 6,516,028 B1 * | 2/2003 | Kobayashi ................... | 375/230 |
| 2008/0030264 A1 * | 2/2008 | Takano et al. ................. | 329/304 |
| 2011/0150506 A1 | 6/2011 | Tanimura et al. | |
| 2012/0189320 A1 * | 7/2012 | Zelensky et al. .............. | 398/158 |
| 2013/0154704 A1 * | 6/2013 | Kim et al. ..................... | 327/170 |
| 2013/0287390 A1 * | 10/2013 | Abe et al. ........................ | 398/26 |

FOREIGN PATENT DOCUMENTS

| | | |
|---|---|---|
| JP | 2008-205654 A | 9/2008 |
| JP | 2011-135176 A | 7/2011 |
| WO | 2011/145712 A1 | 11/2011 |

OTHER PUBLICATIONS

Seb J. Savory, "Digital filters for coherent optical receivers," Optics Express, Jan. 21, 2008, pp. 804-817, vol. 16, No. 2.
Takahito Tanimura, et al, "A Simple Digital Skew Compensator for Coherent Receiver", Proceedings of European Conference and Exhibition on Optical Communication, Sep. 20-24, 2009, pp. 1-2, (ECOC) 2009 Paper 7.3.2, Vienna, Austria.

* cited by examiner

*Primary Examiner* — Tesfaldet Bocure

(74) *Attorney, Agent, or Firm* — Sughrue Mion, PLLC

(57) ABSTRACT

An objective is to provide a digital receiver and a method of compensating waveform that are capable of compensating waveform distortion without increasing the circuit size. A digital receiver 100 according to the present invention includes distortion compensation filters 103 that compensate waveform distortion included in an input signal, skew compensation amount setting units 106 for setting a skew compensation amount used for compensating phase distortion among the waveform distortion, amplitude compensation amount setting units 107 for setting an amplitude compensation amount used for compensating amplitude of the input signal that attenuates upon the compensation of the phase distortion using the skew compensation amount, and filter coefficient calculation circuits 108 for determining a filter coefficient to be set to the distortion compensation filters 103 based on the skew compensation amount and the amplitude compensation amount.

9 Claims, 12 Drawing Sheets

SKEW COMPENSATION AMOUNT 0.25 SAMPLE

SKEW COMPENSATION AMOUNT 0.5 SAMPLE

DIGITAL RECEIVER AND WAVEFORM COMPENSATION METHOD

CROSS REFERENCE TO RELATED APPLICATIONS

This application is a National Stage of International Application No. PCT/JP2012/006273, filed on Oct. 1, 2012, which claims priority from Japanese Patent Application No. 2011-268995, filed on Dec. 8, 2011, the contents of all of which are incorporated herein by reference in their entirety.

TECHNICAL FIELD

The present invention relates to a digital receiver, and particularly to a digital receiver for compensating waveform distortion in an input signal.

BACKGROUND ART

In recent years, increasing demand for higher speed and increase in the capacity of the network has lead to an increase in the importance of digital coherent optical communication techniques. A digital coherent receiving scheme is also referred to as an intradyne reception scheme. The digital coherent receiving scheme can achieve improvement in the receiver sensitivity of 3 to 6 dB or more than the modulation schemes used in large-capacity optical communication systems such as OOK (on-off keying) and DPSK (differential quadrature phase shift keying). Moreover, the digital coherent optical communication scheme has features such that the digital coherent optical communication scheme has a high affinity for multilevel modulation schemes including a polarization multiplexing scheme and QAM (quadrature amplitude modulation).

FIG. 10 is a diagram showing a configuration of a digital coherent receiver disclosed in patent literature 1 and non patent literature 1. An input optical signal is a four-channel (Ix, Qx, Iy, and Qy) multiplexed signal using a DP (dual-polarization)-QPSK (quadrature phase shift keying) signal. The input optical signal is input to a polarization diversity 90° hybrid 1001 and converted by an Optical/Electrical (O/E) converter 1002 into analog electrical signals by different channels. Then, the O/E converted signals are converted into digital signals by A/D (analog to digital) converters 1003 that perform sampling at timings synchronized with a reference sampling clock (CLK) 1004.

The signals converted into the digital signals by the A/D converters 1003 are input to a digital signal processing circuit 1005. Below is an explanation for a background of using a digital signal processing circuit in the digital coherent receiving scheme and a function of the digital signal processing circuit.

There has been an issue in the coherent receiver not associated with the digital signal processing that stable reception is difficult due to an offset and polarization fluctuation in frequency and phase of LO (local oscillator) light.

Meanwhile, development of the electronic device technology enabled high-speed A/D converters to be used in signal processing of high-speed communication devices. Consequently, the digital signal processing performed on converted digital signals has allowed compensation of the offset in the frequency and phase of LO light, which has been the issue in the coherent receiving scheme not associated with the digital signal processing. The digital signal processing has further enabled compensation of polarization fluctuation in optical signals.

As has been mentioned, the digital coherent receiving scheme is capable of more stable and accurate coherent reception than the coherent receiving schemes not associated with the digital signal processing. In addition to the abovementioned compensation of the frequency and phase offset and compensation of polarization fluctuation, the digital coherent receiving scheme further makes possible compensation of wavelength dispersion and higher-level waveform equalization technique.

Non patent literature 2 describes a skew compensation technique as a technique to compensate waveform distortion in a digital coherent receiver. Non patent literature 2 describes a technique to realize highly accurate skew compensation by quadratic function approximation from adjacent, previous, and next sampling points using an FIR (finite impulse response) filter.

Moreover, the spread of high-speed A/D converters has enabled backplane transmission, for example, that conducts inter-substrate connection to carry out higher-level waveform equalization and highly accurate digital clock extraction using the digital signal processing such as MLSE (most likelihood sequence estimation) to address issues such as intersymbol interference and deterioration in jitter characteristics caused by insufficient bandwidth of transmission paths.

CITATION LIST

Patent Literature

Patent literature 1: Japanese Unexamined Patent Application Publication No. 2008-205654

Non Patent Literature

Non patent literature 1: Seb J. Savory, "Digital filters for coherent optical receivers," Optics Express Vol. 16, No. 2, pp. 804-817 (January 2008)

Non patent literature 2: Tanimura et al, "A Simple Digital Skew Compensator for Coherent Receiver," in Proceedings of European Conference and Exhibition on Optical Communication (ECOC) 2009, Vienna, Austria, paper 7.3.2 (2009)

SUMMARY OF INVENTION

Technical Problem

Generally, an oversampling process is performed at one to two times or more the baud rate of a signal. Therefore, in the super high-speed digital signal processing exceeding several dozens of GS/s (samples per second), the sampling rate of the A/D converter cannot be sufficiently increased due to limitations of operating speed and power consumption of the A/D converter. This consequently leads to an issue, in the digital signal processing of super high-speed signals, that sufficient characteristics are difficult to achieve in the distortion compensation filter for compensating various waveform distortion.

In the next generation optical fiber communication system with a transmission rate exceeding 100 Gb/s (gigabit per second), the four-channel multiplexed signals using DP-QPSK shown in FIG. 10 may be used. In such a DP-QPSK system, skew (propagation delay difference) is generated between channels owing to phase shift and group delay characteristics occurring at an optical front-end unit such as a 90° hybrid and TIA (transimpedance amplifier). The skew generated between the channels deteriorates the system performance. For this reason, it has been necessary to compensate the skew in the DP-QPSK signal highly accurately using the distortion compensation filter.

Further, as it is necessary in the super high-speed communication to simultaneously control several distortion such as the abovementioned skew and insufficient bandwidth, there has been an issue of complicating the control of the distortion filter and increasing the circuit size to achieve sufficient compensation performance.

The present invention is made in order to solve at least one of such issues, and an objective of the present invention is to provide a digital receiver and a waveform compensation method capable of highly accurate distortion compensation.

Solution to Problem

A first exemplary aspect of the present invention is a digital receiver including a compensation filter that compensates waveform distortion included in an input signal, skew compensation amount setting unit for setting a skew compensation amount used for compensating phase distortion among the waveform distortion, amplitude compensation amount setting unit for setting an amplitude compensation amount used for compensating amplitude of the input signal that attenuates upon the compensation of the phase distortion using the skew compensation amount, and filter coefficient determination unit for determining a filter coefficient based on the skew compensation amount and the amplitude compensation amount, in which the filter coefficient is set to the compensation filter.

A second exemplary aspect of the present invention is a method of compensating waveform including setting a skew compensation used for compensating phase distortion among waveform distortion included in an input signal, setting an amplitude compensation amount used for compensating amplitude of the input signal that attenuates upon the compensation of the phase distortion using the skew compensation amount, determining a filter coefficient based on the skew compensation amount and the amplitude compensation amount, in which the filter coefficient is set to a compensation filter for compensating the waveform distortion included in the input signal, and compensating the waveform distortion using the compensation filter that is set with the filter coefficient.

Advantageous Effects of Invention

The present invention can provide a digital receiver and a waveform compensation method capable of highly accurate distortion compensation.

DESCRIPTION OF EMBODIMENTS

First Exemplary Embodiment

Figure 1:
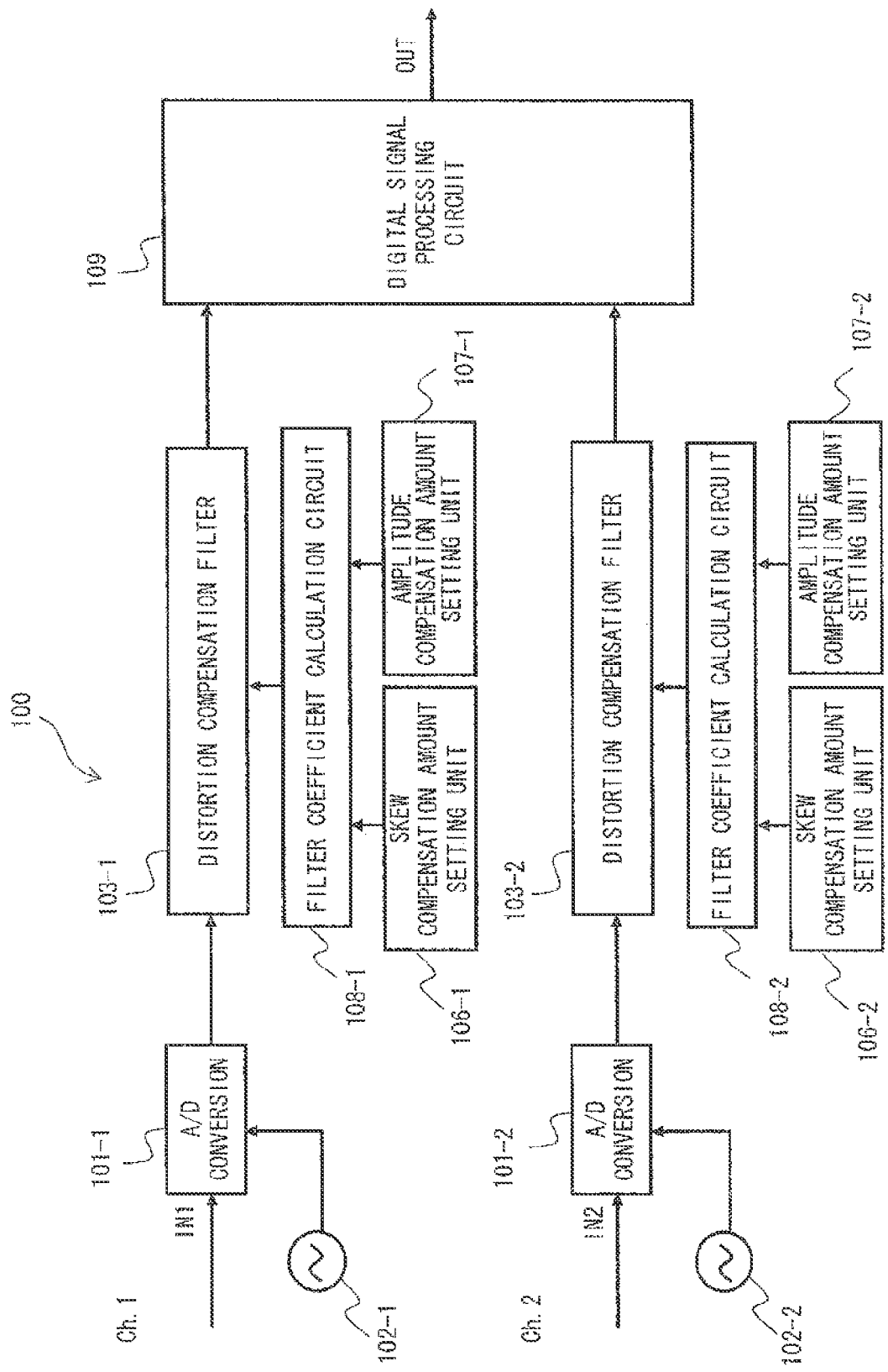
FIG. 1 is a block diagram of a digital receiver according to a first exemplary embodiment.

Hereinafter, exemplary embodiments of the present invention are explained with reference to the drawings. First, illustrated below is a configuration example of a digital receiver according to a first exemplary embodiment of the present invention using FIG. 1. A digital receiver 100 includes A/D converters 101, A/D converter identification clocks 102, distortion compensation filters 103, skew compensation amount setting units 106, amplitude compensation amount setting units 107, filter coefficient calculation circuits 108, and a digital signal processing circuit 109. Note that in FIG. 1, suppose that there are two channels of the units having the similar functions, and the units are denoted by -1, -2, for example, to distinguish the units. The digital receiver according to the first exemplary embodiment may include only one channel of the unit. Unless as otherwise necessary to distinguish the units, the units are described as, for example, "A/D converters 101", and not distinguished by the channels in the explanation.

Below is an explanation for an operation of the digital receiver 100 according to a first exemplary embodiment of the present invention. Transmission signals transmitted from transmitters not shown are input to input terminals (IN1 and IN2) of the digital receiver 100 via transmission paths. For example, optical communication transmission paths using an optical fiber and the like may be used for the transmission paths.

The A/D converters 101 convert analog electrical signals input to IN1 and IN2 into digital signals at timings synchronized with clocks output from the A/D converter identification clocks 102.

The distortion compensation filter 103 compensates wave distortion in the signal converted into the digital signal. At this time, filter coefficients used in the distortion compensation filters 103 are calculated by the filter coefficient calculation circuits 108 based on setting of the skew compensation amount setting unit 106 and the amplitude compensation amount setting unit 107 so as to realize a desired skew compensation amount and band compensation amount simultaneously.

The skew compensation amount setting units 106 set to the filter coefficient calculation circuits 108 a skew compensation amount used for compensating phase distortion among waveform distortion included in the input signals that are input to the distortion compensation filters 103. The skew compensation amount is set to advance or delay phases of the input signals. Moreover, the amplitude compensation amount setting units 107 set to the filter coefficient calculation circuits 108 an amplitude compensation amount used for compensating amplitude of the input signals that attenuate when phase distortion in the input signals is compensated using the skew compensation amount. The amplitude compensation amount is set to increase the amplitude of the input signals.

The digital receiver 100 shown in FIG. 1 includes the AD converters 101, the A/D converter identification clocks 102, the distortion compensation filters 103, the skew compensation amount setting units 106, the amplitude compensation amount setting units 107, and the filter coefficient calculation circuits 108, each for two channels. Output signals from the distortion compensation filters 103 of both channels are output to the digital signal processing circuit 109.

The digital signal processing circuit 109 removes (compensates) waveform distortion included in the input two channels digital signals and demodulates data. Note that FIG. 1 explained the digital receiver 100 with the number of channels being two. However, the number of channels of the digital receiver 100 is not limited to two.

In the digital signal processing circuit 109, it is necessary to perform signal processing in a state where input signals of multiple channels are synchronized, i.e., in a state where no skew exists between the channels. Therefore, when there is skew between the channels of the signals at the time of being input to the digital receiver 100 or when there is phase shift between identification timings of the A/D converter identification clocks, the skew between the channels must be compensated.

Figure 2:
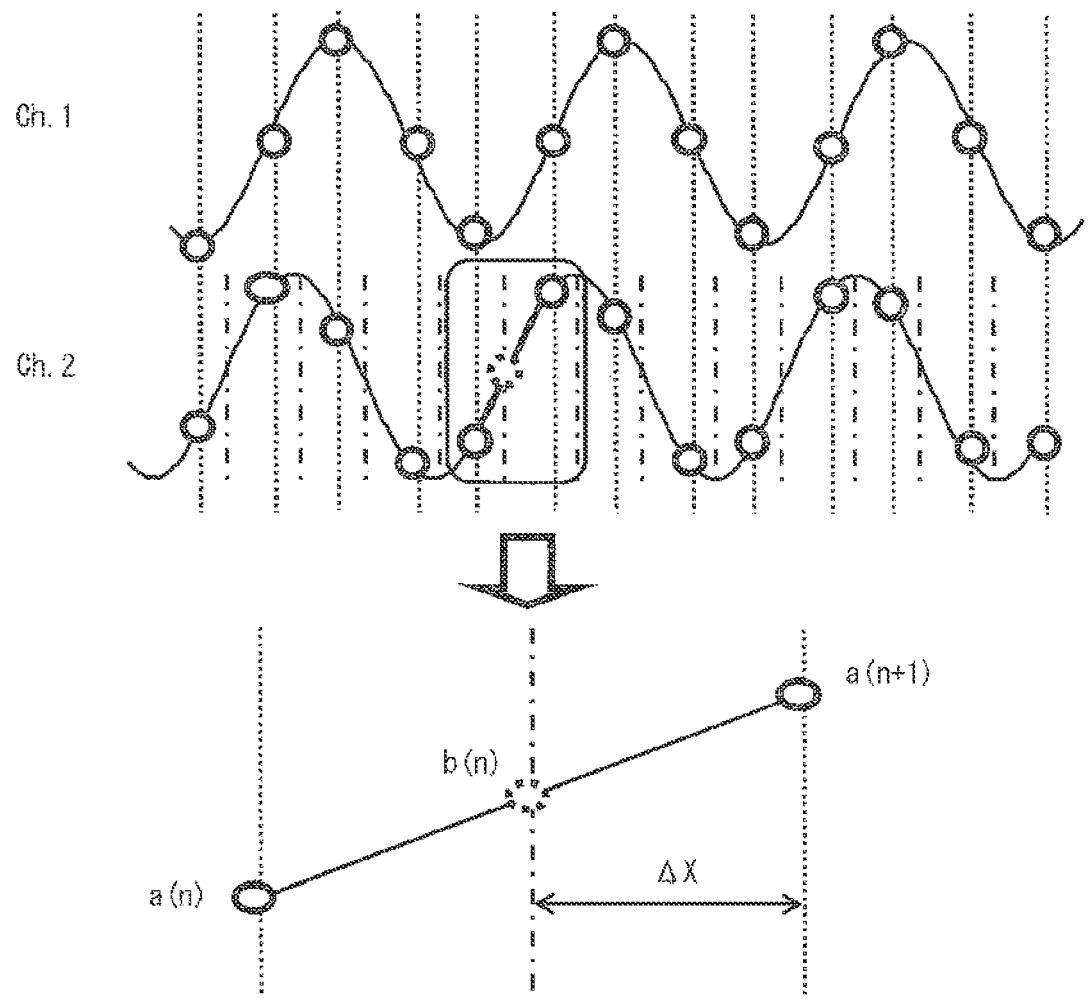
FIG. 2 is a diagram showing a configuration operation of a skew compensation amount according to the first exemplary embodiment.

Next, a skew compensation amount setting operation of the skew compensation amount setting unit 106 according to the first exemplary embodiment of the present invention is explained using FIG. 2. Specifically, the skew compensation amount setting units 106 perform skew compensation using the linear interpolation scheme.

FIG. 2 shows an example of inputting a sin wave as an input signal, performing A/D conversion at twice oversampling frequency of frequency of the input sin wave, and compensating the skew (phase) of a channel 2 (Ch. 2) relative to a channel 1 (Ch. 1). White circles indicate sample points before skew compensation. The dashed lines indicate ideal sample points of the channel 2. Moreover, shown below the arrow is an enlarged diagram of the part surrounded by the rectangular. In the skew compensation by this linear interpolation method, when values of sample points of the channel 2 before skew compensation are a(n) and a (n+1) and a skew compensation amount is Δx (unit: sample=1/fs), a value of a sample point b(n) of the channel 2 after the skew compensation can be obtained by:

$$b(n) = \Delta x \times a(n) + (1 - \Delta x) \times a(n+1) \quad (1)$$

There is an FIR (finite impulse response) filter as a filter circuit to realize this linear interpolation. An example of the skew compensation using the FIR filter is explained using FIG. 3.

Figure 3A:
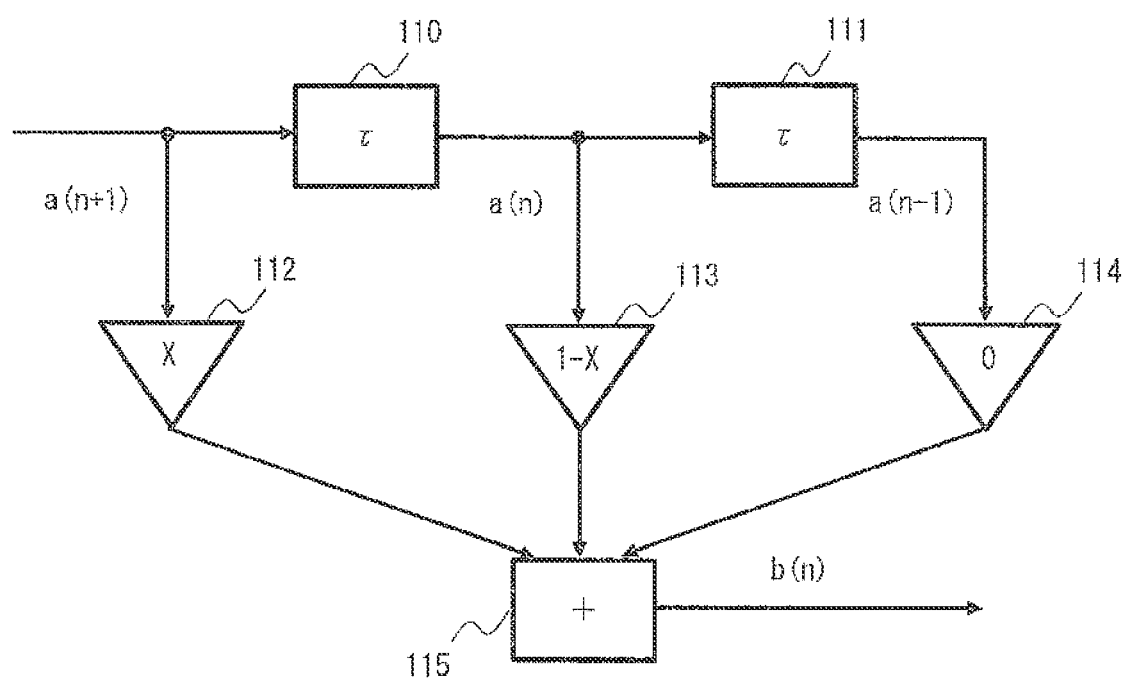
FIG. 3A is a block diagram of an FIR filter according to the first exemplary embodiment.
Figure 3B:
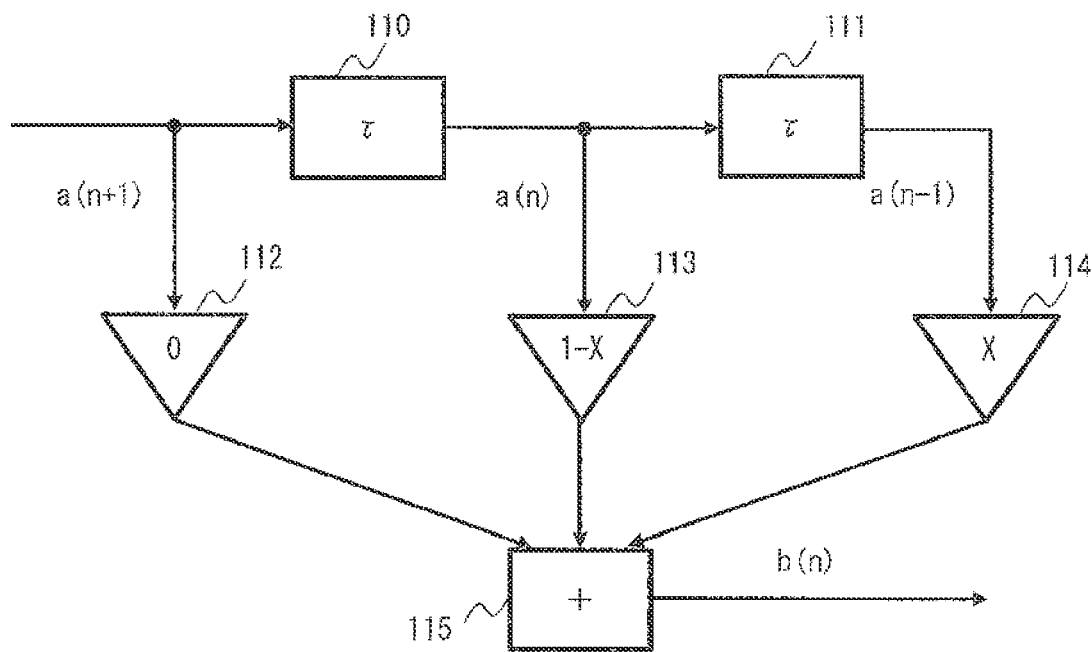
FIG. 3B is a block diagram of the FIR filter according to the first exemplary embodiment.

FIG. 3A shows the FIR filter in the case when the skew compensation amount is −x sample (0<x<1), and FIG. 3B shows the FIR filter in the case when the skew compensation amount is +x sample (0<x<1). The FIR filter includes delay units 110 and 111, multiplication units 112 to 114, and an addition unit 115. For example, the delay unit 110 holds a received signal for a predetermined time, and outputs the holding signal to the delay unit 111 and the multiplication unit 113. Similarly, the delay unit 111 holds the received signal for a predetermined time, and outputs the holding signal to the multiplication unit 114. Moreover, an input signal is firstly input to the delay unit 110 and the multiplication unit 112. Therefore, the input signal input to the delay unit 110 shall be a(n+1), a signal output from the delay unit 110 shall be a(n), and a signal output from the delay unit 111 shall be a(n−1). In this example, n shall be a natural number.

In the case of FIG. 3A, the multiplication unit 112 multiples the signal a(n+1) by a variable x, and outputs a signal obtained from multiplication by the variable x to the addition unit 115. The multiplication unit 113 multiples the signal a(n) by a variable 1−x, and outputs a signal obtained from multiplication by the variable 1−x to the addition unit 115. In FIG. 3A, as the signal a(n−1) is not used, 0 is multiplied in the multiplication unit 114.

The addition unit 115 adds the signals output from the multiplication units 112 and 113, and outputs an added signal b(n).

Moreover, in the case of FIG. 3B, the multiplication unit 113 multiples the signal a(n) by the variable 1−x, and outputs the signal obtained from multiplication by the variable 1−x to the addition unit 115. The multiplication unit 114 multiples the signal a(n−1) by the variable x, and outputs the signal obtained from multiplication by the variable x to the addition unit 115. In FIG. 3B, since the signal a(n+1) is not used, 0 is multiplied in the multiplication unit 112.

In this way, when the skew compensation amount is positive or negative, b(n) in the formula (1) can be calculated by appropriately setting each tap coefficient. Note that FIG. 3 shows an example of a 3-tap FIR filter. However, it is obvious that higher-order FIR can be used for wider range skew compensation.

Incidentally, as stated previously, usually an oversampling process is performed at one to two times or more the baud rate of a signal. One of problems in such skew compensation by the linear interpolation is that sampling rates of the A/D converters 101 cannot be sufficiently increased due to limitations of the operating speed and power consumption in high-speed communication exceeding 10 Gbps. This consequently leads to an issue of not achieving sufficient filter characteristics.

Figure 4A:
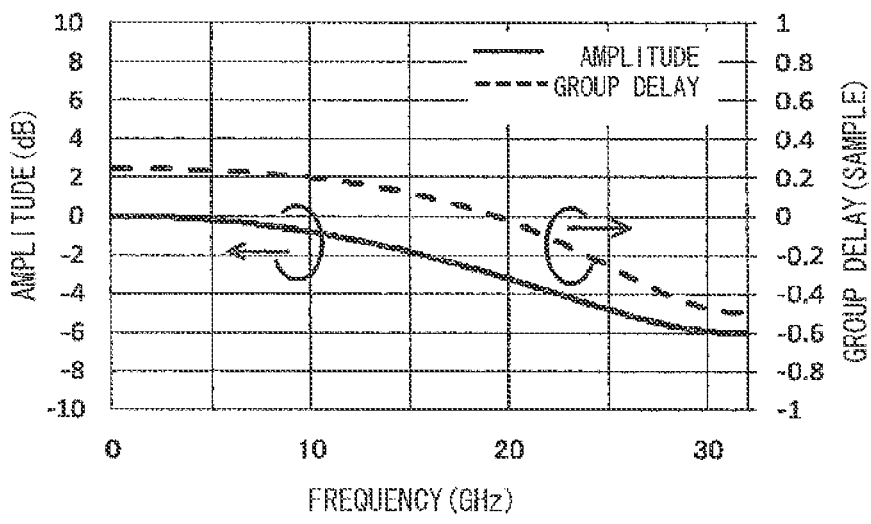
FIG. 4A is a diagram showing transmission characteristics of the FIR filter according to the first exemplary embodiment.
Figure 4B:
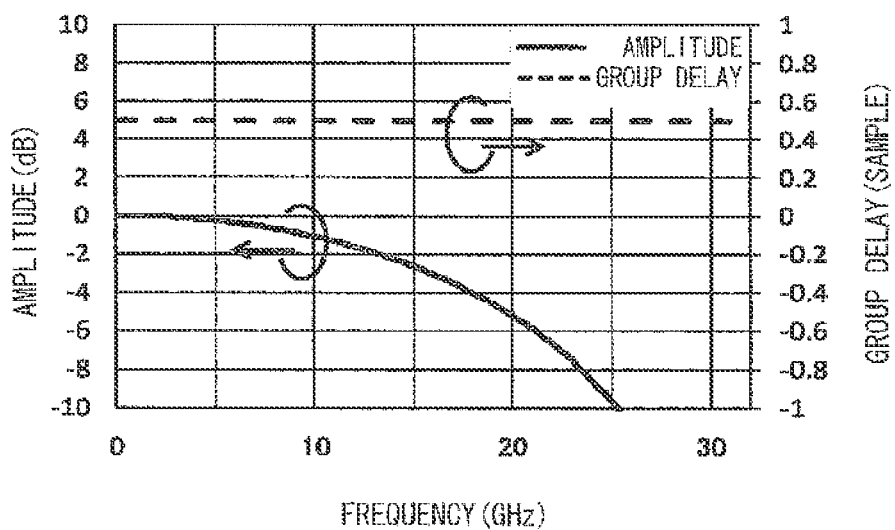
FIG. 4B is a diagram showing transmission characteristics of the FIR filter according to the first exemplary embodiment.

FIG. 4 is a diagram showing transmission characteristics of the FIR filter performing skew compensation. FIG. 4 shows an example of calculating the transmission characteristics when 64 GS/s (Giga-Sample persecond) is performed to a 32 Gb/s signal using the FIR filter shown in FIG. 3. In this case, the signal is oversampled by a factor of two. FIG. 4A shows a calculation of the transmission characteristics of the FIR filter when the skew compensation amount is 0.25 sample, and FIG. 4B shows a calculation of the transmission characteristics of the FIR filter when the skew compensation amount 0.5 sample. In FIGS. 4A and 4B, a left axis represents amplitude characteristics (pass characteristic), and a right axis represents group delay characteristics (skew compensation amount).

It can be seen in FIG. 4A that when the skew compensation amount is 0.25 sample, the amount of attenuation in the amplitude is small (approximately 3 dB at 20 GHz in FIG. 4) at high frequency (for example, around 20 GHz). However, in FIG. 4A, 0.25 sample, which is a desired skew compensation amount as group delay, can be achieved generally at frequency of 10 GHz or less.

On the other hand, in FIG. 4B, when the skew compensation amount is 0.5 samples, amplitude attenuates by about 5 dB at around 20 GHz. However, the performance of desired 0.5 sample can be achieved group delay (skew compensation amount), the performance of desired 0.5 sample can be obtained.

As has been explained, in the high-speed digital communication, an insufficient oversampling amount of the A/D converter 101 leads to deficiency in performance of the waveform distortion compensation filters including the FIR filter. This therefore generates an issue of being unable to sufficiently remove (compensate) the waveform distortion and an issue of generating additional waveform distortion (deterioration in transmission characteristics).

Moreover, a change in setting values of the filter coefficient calculation circuits 108 (for example, the skew compensation amount in FIG. 4 (group delay amount)), can involve changes in other transmission characteristics (for example, amplitude characteristics (pass characteristics) in FIG. 4). This therefore generates an issue of being unable to attain stable system performance.

This further leads to an issue in the high-speed communication that sufficient frequency characteristics cannot be achieved due to insufficient bandwidths of the A/D converter 101, transmission devices and reception devices not shown (for example, optical and electrical elements including an optical modulator, a driver amplifier, a 90° hybrid, a photodiode, and a preamplifier).

Figure 5A:
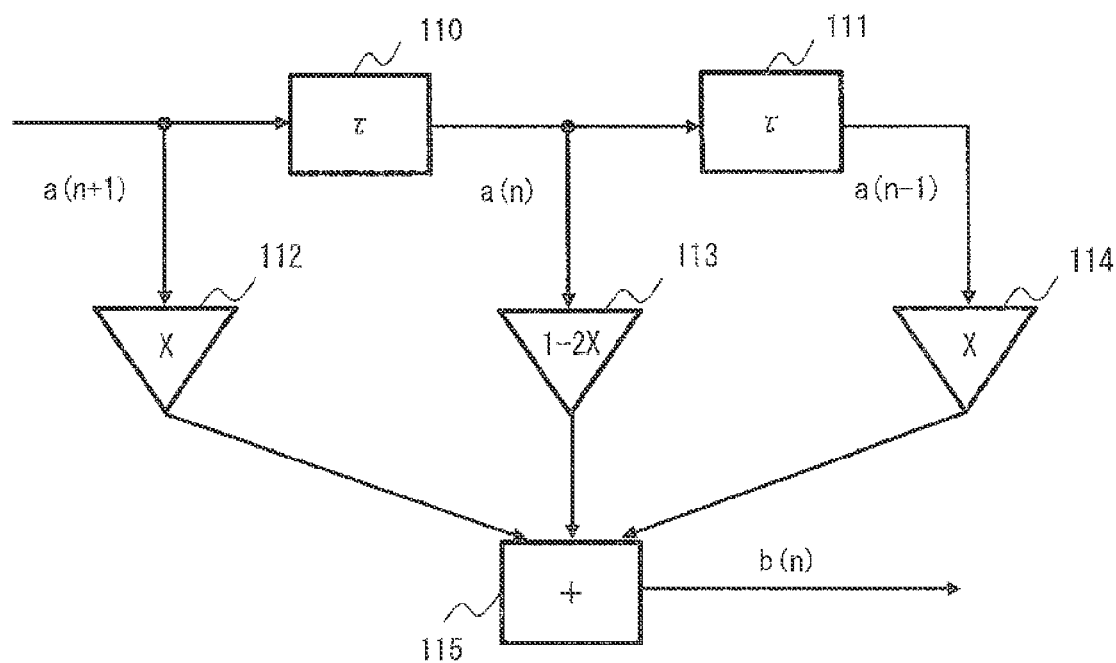
FIG. 5A is a block diagram of the FIR filter according to the first exemplary embodiment.

The digital receiver according to the first exemplary embodiment of the present invention further includes the amplitude compensation amount setting unit 107 in order to solve those issues. Then, in the digital receiver according to the first exemplary embodiment, the amplitude compensation amount setting units 107 compensate deterioration in the bandwidth characteristics caused by the skew compensation amount setting units 106 and transmission and reception devices so as to realize preferable signal transmission characteristics. There is a circuit by the FIR filter as a filter circuit using the values set by the amplitude compensation amount setting units 107. FIG. 5A is a diagram showing a configuration example of the FIR filter using the values set by the amplitude compensation amount setting units 107.

FIG. 5A shows an example of a 3 tap-FIR filter. Since the FIR filter shown in FIG. 5A has a similar configuration as the FIR filter shown in FIGS. 3A and 3B, detailed explanation will not be presented here. In FIG. 5A, filter coefficients of the multiplication units 112 to 114 are set to x, 1-2x, and x in each tap, thereby achieving amplitude with flat group delay characteristics, i.e., enabling compensation of the amplitude not to generate new skew. This makes it possible to obtain a signal with amplitude not attenuating over a broadband, thereby achieving an amplitude compensation filter having high-pass filter (HPF) or low-pass filter (LPF) characteristics.

Figure 5B:
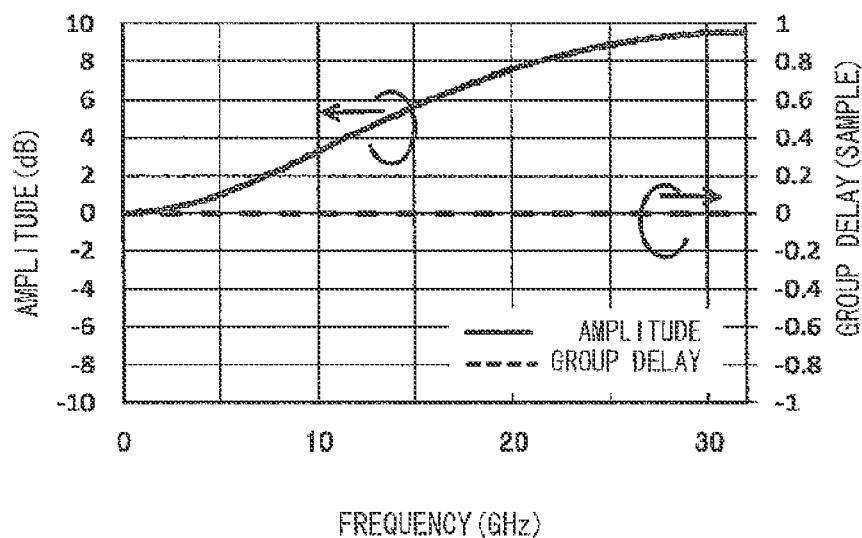
FIG. 5B is a diagram showing transmission characteristics of the FIR filter according to the first exemplary embodiment.

FIG. 5B shows transmission characteristics when x=−0.5 in the FIR filter of FIG. 5A as an example of a high-pass filter setting. For example, FIG. 5B shows control of the amplitude to be of opposite characteristics to the attenuating amplitude when skew compensation is performed using the FIR filter of FIG. 3, and the amplitude attenuates as shown in FIG. 4B. This enables compensation of the attenuating amplitude upon skew compensation. In this case, new skew is not generated as shown in FIG. 5B.

Although FIG. 5 have shown the example of the 3 tap-FIR filter, a higher-order FIR filter or IIR (infinite impulse response) filter can also be used for more specific amplitude compensation.

The above explanation is related to the method of realizing skew compensation and amplitude compensation by different FIR filters as functional components of the distortion compensation filters 103. In the present invention, the filter coefficients concerning the distortion compensation filters 103 are calculated by the filter coefficient calculation circuits 108 based on the setting of the skew compensation amount setting units 106 and the amplitude compensation amount setting units 107 and set in such a manner as to realize the desired skew compensation amount and amplitude compensation amount simultaneously. This allows integrated control of the distortion compensation filters 103, thereby realizing implementation of the distortion compensation filters 103 in a circuit, and improvement in controllability and efficiency of the circuit.

Figure 6A:
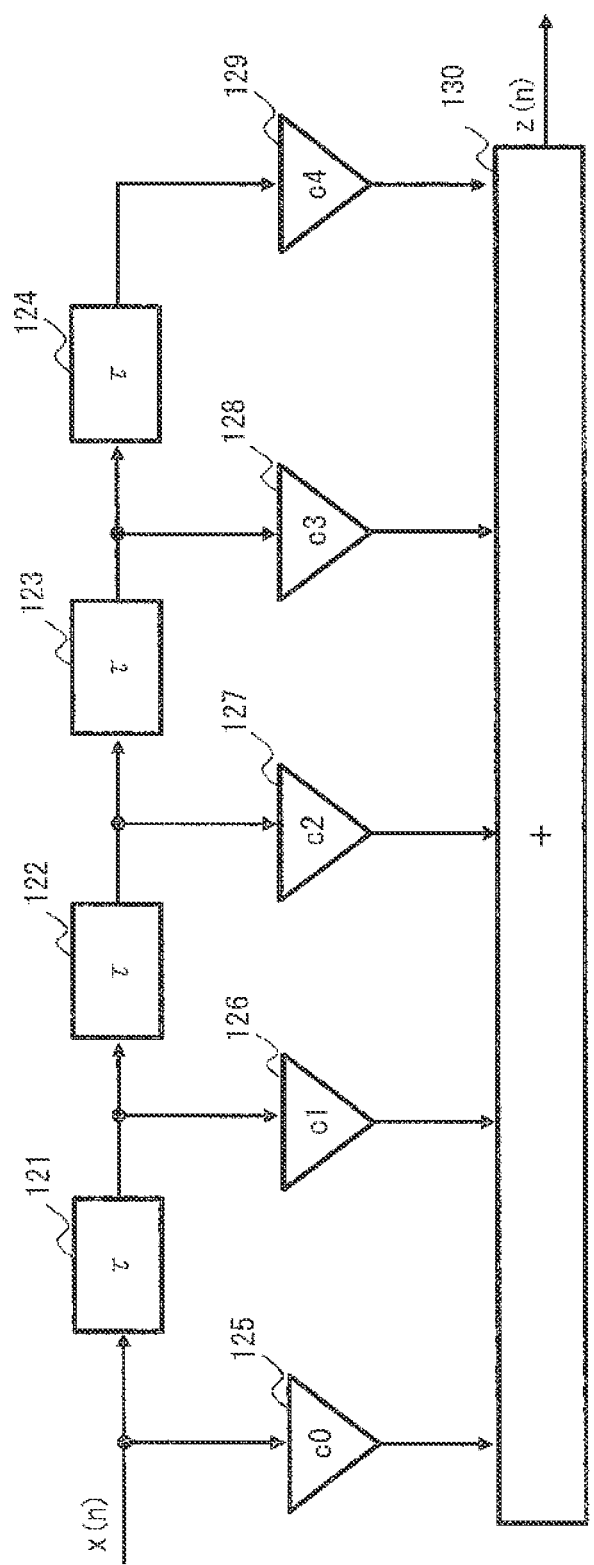
FIG. 6A is a block diagram of a distortion compensation filter according to the first exemplary embodiment.
Figure 6B:
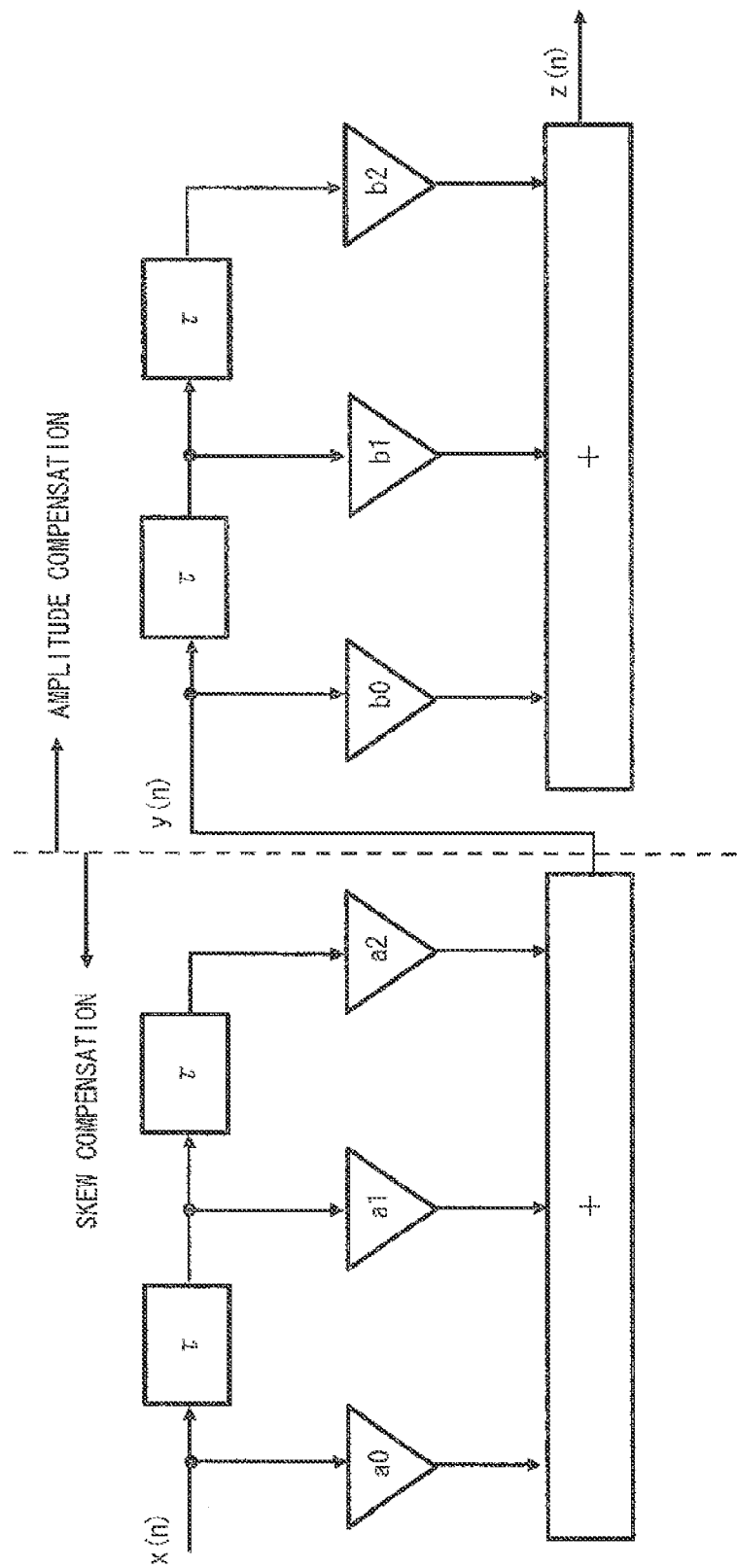
FIG. 6B is a block diagram of the distortion compensation filter when the FIR filters according to the first exemplary embodiment are connected in cascade.

FIG. 6A shows an example of the distortion compensation filter 103 using a 5 tap-FIR filter. The distortion compensation filter 103 includes delay units 121 to 124, multiplication units 125 to 129, and an addition unit 130. Since the delay units, the multiplication units, and the addition unit have the similar functions as those in the FIR filter of FIG. 3, detailed explanation will not be presented here. Moreover, FIG. 6B is a configuration example of cascade connection of a distortion compensation filter including the FIR filter for skew compensation of FIG. 3 and the FIR filter for amplitude compensation of FIG. 5. An input signal shall be x(n) and an output from the FIR filter for skew compensation shall be y(n), and an output from the FIR filter for amplitude compensation, i.e., an output from the distortion compensation filter 103 shall be z(n). The compensation filter of FIG. 6A can be equivalent to the that of FIG. 6B using tap coefficients of the distortion compensation filter 103 $C_0$, $C_1$, $C_2$, $C_3$, and $C_4$, that are calculated by the following formulas using tap coefficients of the FIR filter for skew compensation $a_0$, $a_1$, and $a_2$ and tap coefficients of the FIR filter for amplitude compensation $b_0$, $b_1$, and $b_2$.

$$C_0 = a_0 b_0$$

$$C_1 = a_0 b_1 + a_1 b_0$$

$$C_2 = a_0 b_2 + a_1 b_1 + a_2 b_0$$

$$C_3 = a_2 b_1 + a_1 b_2$$

$$C_4 = a_2 b_2$$

Accordingly, the filter coefficient calculation circuits 108 calculate the filter coefficients according to the formula for calculating $C_0$ to $C_4$ based on the setting of the skew compensation amount setting units 106 and the amplitude compensation amount setting units 107, thereby achieving the distortion compensation filters 103 capable of integrally controlling the skew compensation and amplitude compensation.

Note that although FIG. 6A illustrates an example of distortion compensation filter using the 5 tap-FIR filter, the filter coefficient calculation is performed by similar calculation in the case of using a higher-order FIR filter or IIR filter and the distortion compensation filter 103 capable of integrally controlling the skew compensation and the amplitude compensation can be configured.

Moreover, the FIR filter by the linearity interpolation circuit of FIG. 3 is an example of the skew compensation scheme, and other schemes may be used for the skew compensation scheme. Skew compensation can be realized in a similar manner by the method of using a higher-order FIR filter or the method of rate conversion by upsampling and interpolation filter, for example. Further, the FIR filter of FIG. 5 is an example of amplitude compensation scheme, and similar band compensation can be realized by the method of using a higher-order FIR filter, the method of using an IIR filter, and the method of using an FDE (frequency domain equalization) circuit, for example. In any case, it is possible to compose a preferable digital receiver that controls and implements in a circuit the distortion compensation filter 103 and achieves improvement in the controllability and efficiency of the circuit by calculating the filter coefficients for integrated control of the skew compensation filter and band compensation filter.

Additionally, although in the digital receiver 100 shown in FIG. 1, the skew compensation and amplitude compensation has been described as the wave distortion compensation, depending on the target to compensate its distortion, compensation amounts can be independently configured, the filter coeffieicnet calculation circuits 108 can calculate the filter coefficients of the distortion compensation filters 103, and the distortion compensation filters 103 can be integrally controlled also for distortion compensation other than skew and ampltiude (for example, waveform distortion in a transmitter, a transmission path, an optical front-end unit (which are not shown), distortion due to calibration errors in the A/D converters 101, distortion in the band-limiting filter by the duobinary modulation scheme, distortion in a conversion filter from an RZ (return-to-zero) signal to an NRZ (non-RZ) signal).

As described above, the digital receiver according to the first exemplary embodiment calculates the filter coefficients of the distortion compensation filters that integrally control the skew compensation filter function and the band compensation filter function while independently controlling each of the skew compensation amount and the amplitude compensation amount, thereby realizing improvement in the controllability of the distortion compensation filter and efficiency of the circuit implementation simultaneously. As a result, the digital receiver according to the first exemplary embodiment achieves an exemplary advantage of realizing the distortion compensation with high controllability, low power consumption, high performance, and high accuracy.

Second Exemplary Embodiment

Figure 7:
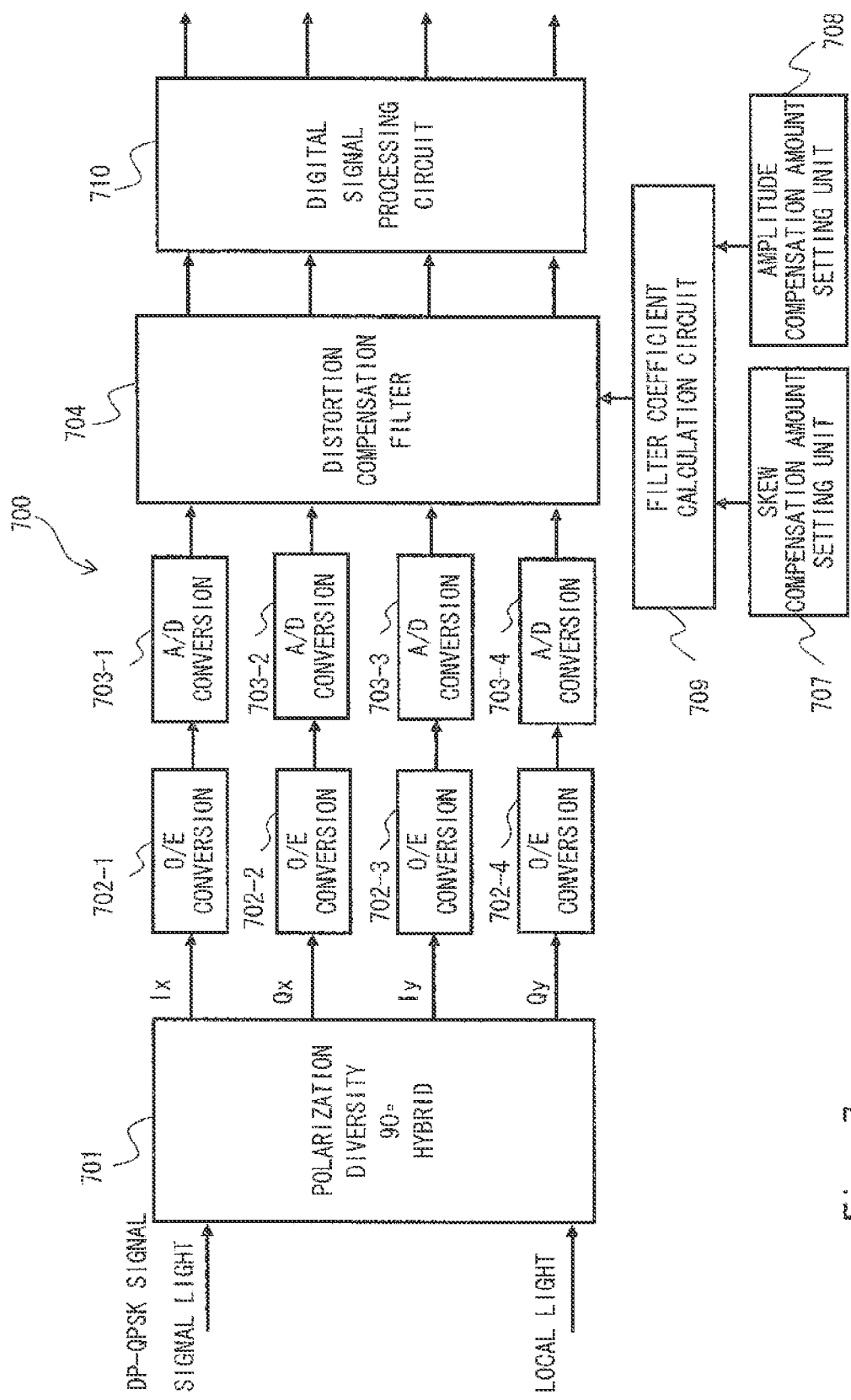
FIG. 7 is a block diagram of a digital receiver according to a second exemplary embodiment.

Next, a second exemplary embodiment of the present invention is explained. FIG. 7 is a diagram showing a configuration example of a digital receiver 700 according to the second exemplary embodiment of the present invention. In FIG. 7, a digital receiver 700 includes a polarization diversity 90° hybrid 701, optical/electrical (O/E) converters 702, A/D converters 703, a distortion compensation filter 704, a skew compensation amount setting unit 707, an amplitude compensation amount setting unit 708, a filter coefficient calculation unit 709, and a digital signal processing circuit 710.

In FIG. 7, when there are a plurality of units having the similar functions, the units are denoted by -1, -2, for example, to distinguish the units. Unless as otherwise necessary to distinguish the units, the "O/E converter 702-1", the "O/E converter 702-2" and the like are described as the "O/E converter 702".

Following is an explanation for an operation of the digital receiver 700 according to the second exemplary embodiment of the present invention. In FIG. 7, a DP-QPSK optical signal is an optical signal transmitted from an optical transmitter not shown. Further, the DP-QPSK optical signal is received by the digital receiver 700 of the present invention in a state of including waveform distortion by wavelength dispersion of an optical fiber transmission path. The received DP-QPSK optical signal is combined with local oscillator light (local light) by the polarization diversity 90° hybrid 701 and demodulated into four-channel optical signals Ix, Qx, Iy, and Qy.

The demodulated four signals Ix, Qx, Iy, and Qy are converted by the O/E converters (optical-to-electrical converters) 702-1 to 702-4 respectively into electrical signals. Then, each of Ix, Qx, Iy, and Qy signals converted into electrical signals are converted into digital signals by the A/D converters 703-1 to 703-4 respectively that are disposed in subsequent stages.

The distortion compensation filter 704 is controlled by a filter coefficient calculated by the filter coefficient calculation circuit 709. At this time, the filter coefficient calculation circuit 709 calculates the filter coefficient based on setting information of the skew compensation amount setting unit 707 and the amplitude compensation amount setting unit 708.

The distortion compensation filter 704 compensates skew between channels of the converted digital signals. Further, as for an X polarized signal (Ix and Qx channels) and an Y polarized signal (Iy and Qy) with compensated skew, in the skew compensation, amplitude of the signals that attenuate are compensated.

The distortion compensation filter 704 outputs to the digital signal processing circuit 710 the signal with its distortion being compensated. The digital signal processing circuit 710 performs digital signal processing on the received signal, such as wavelength dispersion compensation, clock extraction, retiming, polarization tracking, and estimation of local light phase. Note that details of these processes in the digital signal processing circuit 710 are not directly related to the present invention and well known in the art as disclosed in non patent literature 1, for example, thus the explanation will not be presented here.

Figure 8:
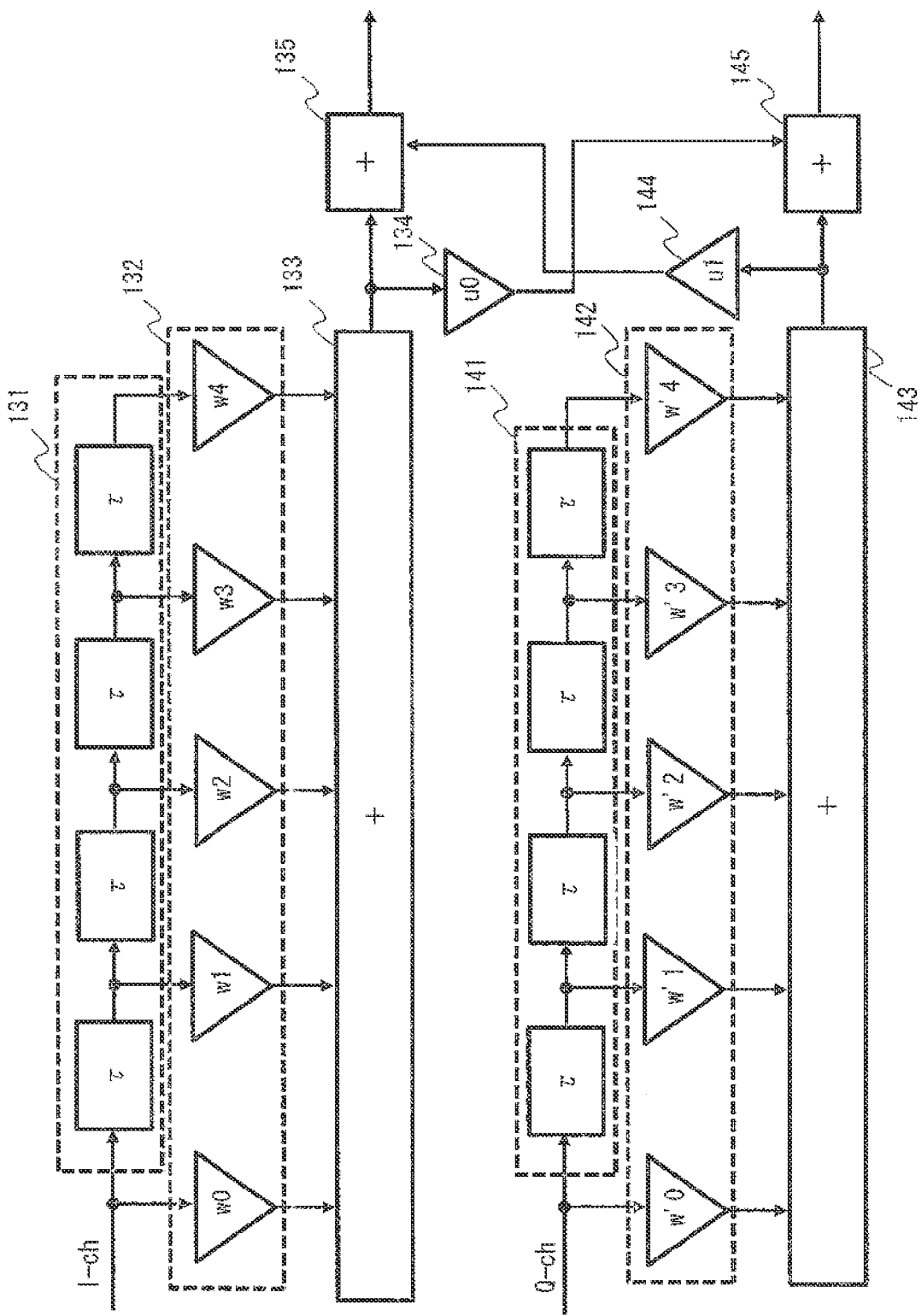
FIG. 8 is a block diagram of a butterfly FIR filter according to the second exemplary embodiment.

The skew compensation by the digital receiver 700 according to the second exemplary embodiment of the present invention may use a filter that performs linear interpolation of FIG. 3 in a similar manner as the digital receiver 100 according to the first exemplary embodiment of the present invention. Alternatively, as shown in FIG. 8, a butterfly FIR filter for compensating crosstalk between the Ix(Iy) channel and the Qx(Qy) channel may be used, as shown in FIG. 8. The butterfly FIR filter of FIG. 8 includes, for the Ix(Iy) channel, a delay unit 131, a multiplication unit 132, an addition unit 133, a multiplication unit 134, and an addition unit 135. As the delay unit 131, the multiplication unit 132, and the addition unit 133 have similar functions as those in the FIR filter explained using FIG. 6A, detailed explanation will not be presented here. Furthermore, the butterfly FIR filter of FIG. 8 includes, for the Qx(Qy) channel, a delay unit 141, a multiplication unit 142, an addition unit 143, a multiplication unit 144, and an addition unit 145. Since the delay unit 141, the multiplication unit 142, and the addition unit 143 have similar functions as those in the FIR filter explained using FIG. 6A, detailed explanation will not be presented here.

The multiplication unit 134 multiples an signal output from the addition unit 133 by a tap coefficient $U_0$, for example, and outputs the obtained signal to the addition unit 145. The addition unit 145 adds a signal output from the addition unit 143 and the signal output from the multiplication unit 134, and outputs the obtained signal to a subsequent circuit. Similarly, the multiplication unit 144 multiples the signal output from the addition unit 143 by a tap coefficient $U_1$, for example, and outputs the obtained signal to the addition unit 135. The addition unit 135 adds a signal output from the addition unit 133 and the signal output from the multiplication unit 144, and outputs the obtained signal to a subsequent circuit.

Moreover, the above exemplary embodiment illustrated the DP-QPSK signal as the input signal, the present invention can be applied to signals with various modulation schemes such as ASK (amplitude shift keying), BPSK (binary PSK), SP (single polarization)-QPSK, and OFDM (orthogonal frequency division multiplexing) signals.

As described so far, the digital receiver according to the second exemplary embodiment of the present invention, in a similar manner as the first exemplary embodiment, calculates the filter coefficient of the distortion compensation filter that integrally controls the skew compensation filter function and the band compensation filter function while independently controlling each of the skew compensation amount and the amplitude compensation amount, thereby realizing improvement in the controllability of the distortion compensation filter and efficiency of the circuit implementation simultaneously. As a result, the digital receiver according to the second exemplary embodiment achieves an exemplary advantage of realizing the distortion compensation with high controllability, low power consumption, high performance, and high accuracy.

Third Exemplary Embodiment

Figure 9:
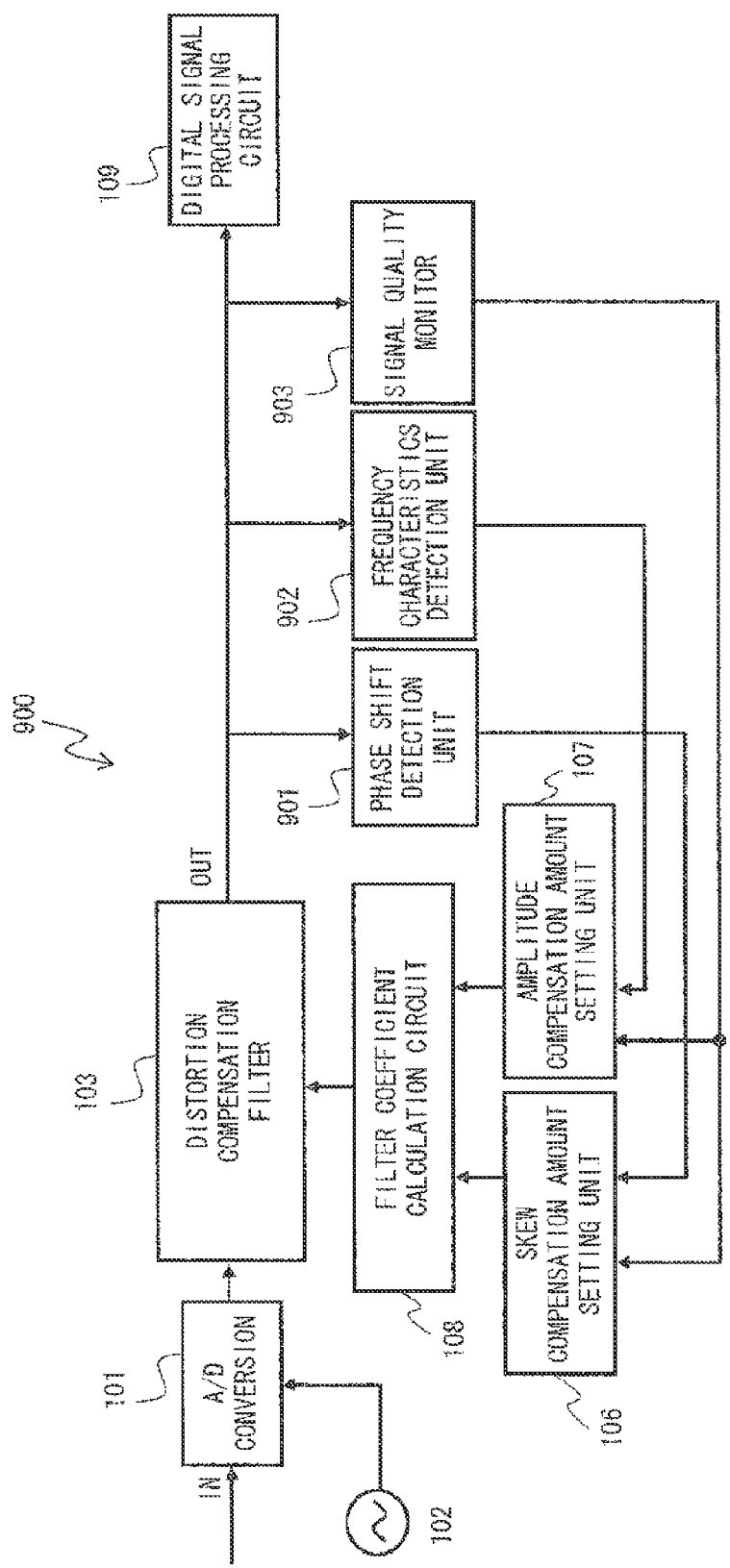
FIG. 9 is a block diagram of a digital receiver according to a third exemplary embodiment.
Figure 10:
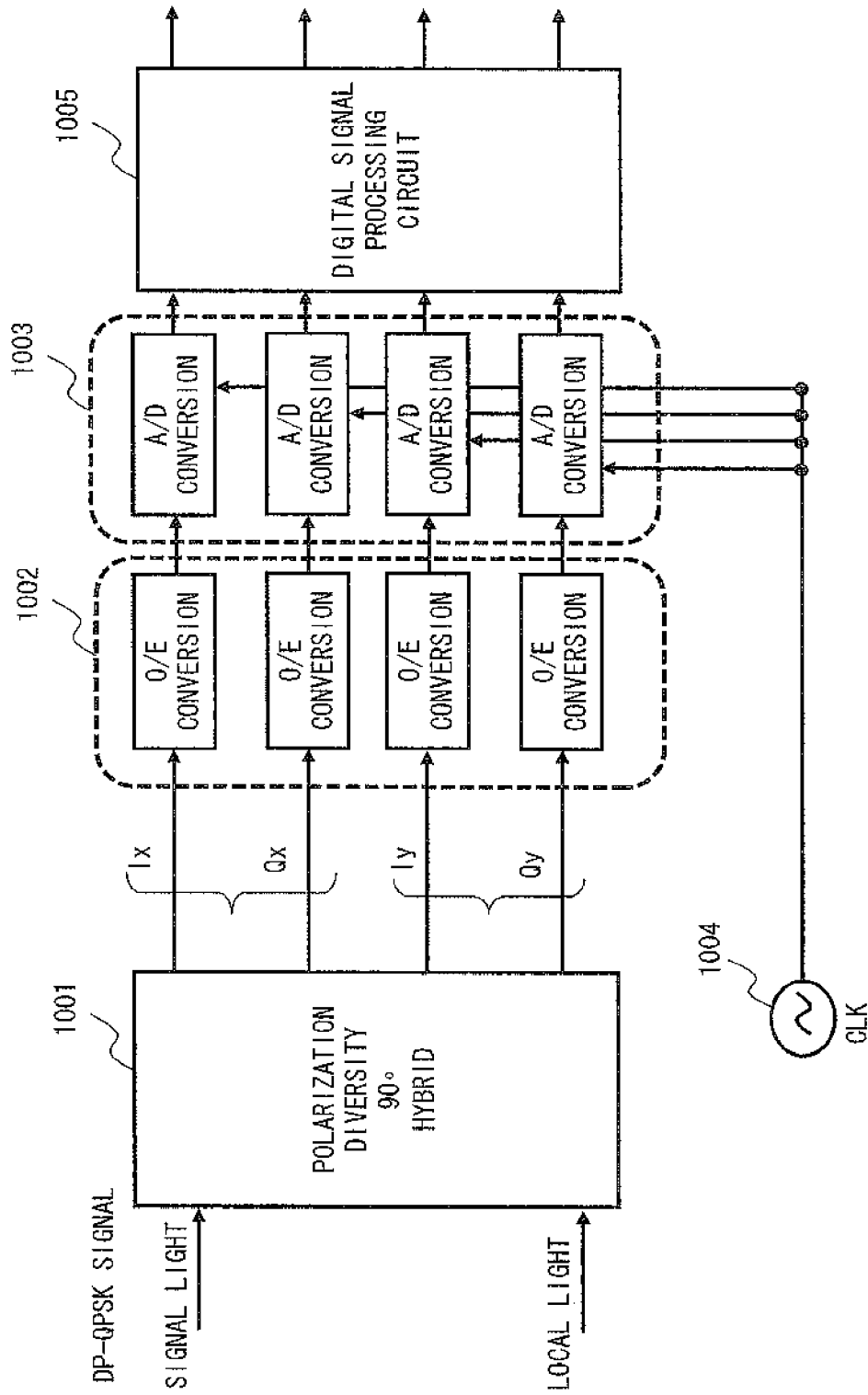
FIG. 10 is a block diagram of a common digital coherent receiver.

Next, a third exemplary embodiment of the present invention is explained. FIG. 9 is a diagram showing a configuration example of a digital receiver 900 according to the third exemplary embodiment of the present invention. In FIG. 9, the digital receiver 900 includes an A/D converter 101, an A/D converter identification clock 102, a distortion compensation filter 103, a skew compensation amount setting unit 106, an amplitude compensation amount setting unit 107, a filter coefficient calculation circuit 108, and a digital signal processing circuit 109. Furthermore, the digital receiver 900 includes a phase shift detection unit 901, a frequency characteristics detection unit 902, and a signal quality monitor 903.

Next, an operation of the digital receiver 900 is explained. The digital receiver 900 shown in FIG. 9 receives a signal output through the transmission path. The A/D converter 101 converts an input signal, which is an analog electrical signal, into a digital signal at a timing synchronized with the A/D converter identification clock 102. The distortion compensation filter 103 performs skew compensation, i.e., phase adjustment and amplitude compensation. Moreover, the filter coefficient calculation circuit 108 calculates the filter coefficient of the distortion compensation filter 103 based on the setting of the skew compensation amount setting unit 106 and the amplitude compensation amount setting unit 107. The phase shift detection unit 901 is further included in the subsequent stage of the distortion compensation filter 103 to detect phase shift (skew) of the signal. An output signal from the phase shift detection unit 901 is connected to the skew compensation amount setting unit 106. The skew compensation amount setting unit 106 adaptively switches the skew compensation amount based on phase shift information from the phase shift detection unit 901. The frequency characteristics detection unit 902 is further included in the subsequent stage of the distortion compensation filter 103 and detects frequency characteristics of the signal. An output signal from the frequency characteristics detection unit 902 is connected to the amplitude compensation amount setting unit 107. The amplitude compensation amount setting unit 107 can adoptively switch the amplitude compensation amount based on frequency characteristics (amplitude characteristics) information from the frequency characteristics detection unit 902.

By using an FFT circuit and a spectrum analyzer as the frequency characteristics detection unit 902, it is possible to directly monitor the signal spectrum and detect frequency characteristics of the signal. It is not necessary to directly monitor the signal spectrum, but alternatively, a modulation scheme of the signal may be detected and values from preset values may be selected or switched. That is, in the system with its modulation scheme adoptively changing, frequency characteristics peculiar to the modulation scheme are known, thus it is possible to output as a detection result the frequency characteristics according to a change in the modulation scheme by selecting the frequency characteristics preset in advance corresponding to the modulation scheme.

Further, the signal quality monitor 903 is included in the subsequent stage of the distortion compensation filter 103 and monitors signal quality information including waveform information, eye opening, and a bit error rate (BER) of the signal. An output signal from the signal quality monitor 903 is connected to at least one of the skew compensation amount setting unit 106 and the amplitude compensation amount setting unit 107. The skew compensation amount setting unit 106 or the amplitude compensation amount setting unit 107 can adaptively switch the skew compensation amount and the amplitude compensation amount for configuration based on the signal quality information from the signal quality monitor 903.

As explained above, the digital receiver 900 can detect skew and amplitude characteristics by the phase shift detection unit 901, the frequency characteristics detection unit 902, and the signal quality monitor included in the digital receiver 900. Therefore, the skew compensation amount setting unit 106 and the amplitude compensation amount setting unit 107 set the skew compensation amount and the amplitude compensation amount based on the detected skew and the amplitude characteristics. Furthermore, the filter coefficient calculation circuit 108 calculates the filter coefficient of the distortion compensation filter that integrally controls the skew compensation filter function and the band compensation filter function based on the skew compensation amount and the amplitude compensation amount, thereby realizing the improvement in the controllability of the distortion compensation filter and efficiency of the circuit implementation simultaneously. As a result, the digital receiver according to the third exemplary embodiment achieves an exemplary advantage of realizing the distortion compensation with high controllability, low power consumption, high performance, and high accuracy.

Note that the present invention is not limited by the above exemplary embodiments, but various modifications can be made without departing from the sprit of the invention.

Although the present invention has been explained with reference to the exemplary embodiments, the present invention is not limited by above. Various modifications conceivable by those who skilled in the art can be made to the configurations and details of the present invention within the scope of the invention.

The present application claims priority rights of and is based on Japanese Patent Application No. 2011-268995 filed on Dec. 8, 2011 in the Japanese Patent Office, the entire contents of which are hereby incorporated by reference.

REFERENCE SIGNS LIST

100 DIGITAL RECEIVER
101 AD CONVERTER
102 A/D CONVERTER IDENTIFICATION CLOCK
103 DISTORTION COMPENSATION FILTER
106 SKEW COMPENSATION AMOUNT SETTING UNIT
107 AMPLITUDE COMPENSATION AMOUNT SETTING UNIT
108 FILTER COEFFICIENT CALCULATION CIRCUIT
109 DIGITAL SIGNAL PROCESSING CIRCUIT
110 DELAY UNIT
111, 121-124, 131, and 141 DELAY UNIT
112-114, 125-129, 132, 134, 142, and 144 MULTIPLICATION UNIT
115, 130, 133, 135, 143, and 145 ADDITION UNIT
700 DIGITAL RECEIVER
701 POLARIZATION DIVERSITY 90° HYBRID
702 O/E CONVERTER 703 A/D CONVERTER
704 DISTORTION COMPENSATION FILTER
707 SKEW COMPENSATION AMOUNT SETTING UNIT
708 AMPLITUDE COMPENSATION AMOUNT SETTING UNIT
709 FILTER COEFFICIENT CALCULATION CIRCUIT
710 DIGITAL SIGNAL PROCESSING CIRCUIT
901 PHASE SHIFT DETECTION UNIT
902 FREQUENCY CHARACTERISTIC DETECTION UNIT
903 SIGNAL QUALITY MONITOR

The invention claimed is:

1. A digital receiver comprising:
a compensation filter that compensates waveform distortion included in an input signal;
a skew compensation amount setting unit that sets a skew compensation amount, the skew compensation amount being used for compensating phase distortion among the waveform distortion;
an amplitude compensation amount setting unit that sets an amplitude compensation amount, the amplitude compensation amount being used for compensating amplitude of the input signal that attenuates upon the compensation of the phase distortion using the skew compensation amount; and
a filter coefficient determination unit that determines a filter coefficient based on the skew compensation amount and the amplitude compensation amount, the filter coefficient being set to the compensation filter.

2. The digital receiver according to claim 1, wherein
the compensation filter is composed of an FIR (Finite Impulse Response) filter, and
the filter coefficient determination unit determines the filter coefficient to be set to the FIR filter based on the skew compensation amount and the amplitude compensation amount.

3. The digital receiver according to claim 1, wherein
the compensation filter is composed of an IIR (Infinite Impulse Response) filter, and
the filter coefficient determination unit determines a filter coefficient to be set to the IIR filter based on the skew compensation amount and the amplitude compensation amount.

4. The digital receiver according to claim 1, wherein the amplitude compensation amount is controlled to a value not generating new phase distortion in the input signal that is set with the skew compensation amount.

5. The digital receiver according to claim 1, wherein the skew compensation amount setting unit, using at least two sample points of the input signal and the skew compensation amount, corrects the sample points of the input signal by linear interpolation.

6. The digital receiver according to claim 1, further comprising a signal quality monitor that monitors quality of a signal output from the compensation filter,
wherein the skew compensation amount setting unit and the amplitude compensation amount setting unit determine the skew compensation amount and the amplitude compensation amount based on a result of monitoring by the signal quality monitor.

7. The digital receiver according to claim 6, wherein the signal quality monitor comprises at least one of phase shift detection unit, frequency characteristics detection unit, an error rate monitor, and a waveform monitor.

8. The digital receiver according to claim 1, wherein the input signal is an electrical signal converted from an optical signal.

9. A method of compensating waveform comprising:
setting a skew compensation amount, the skew compensation amount being used for compensating phase distortion among waveform distortion included in an input signal;
setting an amplitude compensation amount, the amplitude compensation amount being used for compensating amplitude of the input signal that attenuates upon the compensation of the phase distortion using the skew compensation amount;
determining a filter coefficient based on the skew compensation amount and the amplitude compensation amount, the filter coefficient being set to a compensation filter for compensating the waveform distortion included in the input signal; and
compensating the waveform distortion using the compensation filter, the compensation filter being set with the filter coefficient.

* * * * *